Oct. 29, 1929.  C. C. YORDE ET AL  1,733,848

SPECTACLE CASE

Filed March 24, 1927

INVENTOR.
Charles C. Yorde
John G. Hewicke
By John W. Strehli
ATTORNEY.

Patented Oct. 29, 1929

1,733,848

UNITED STATES PATENT OFFICE

CHARLES C. YORDE AND JOHN G. HAUCKE, OF CINCINNATI, OHIO

SPECTACLE CASE

Application filed March 24, 1927. Serial No. 178,095.

The object of our invention is to produce a spectacle case which shall be cheap of manufacture, simple in construction and highly efficient in use. A spectacle case made after our invention is light, yet possesses a great deal of rigidity, and keeps its form so that the spectacles which are placed in the case cannot readily be broken and in which the spectacles can be placed very readily, quickly, and the case closed to hold the spectacles intact and against too free movement while in the case. It possesses all the advantages of a metal case, yet the whole of it is made of leather and same is positioned by a strip of metal placed therein to shape the spectacle case.

One of the salient features of the invention consists in making a leather pouch or container for the spectacles held to proper form by a metal spacer placed in the bottom of said pouch on the inside thereof.

The spectacle case makes a fine appearance, as a new article of manufacture.

In the accompanying drawing forming part of this specification:

Figure 1:
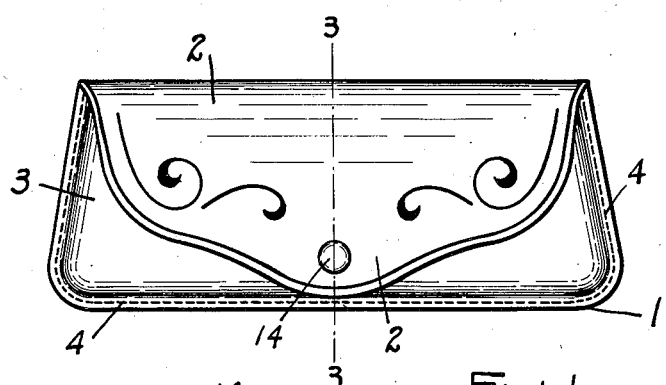
Fig. 1, is a front view of the spectacle case embodying our invention.
Figure 2:
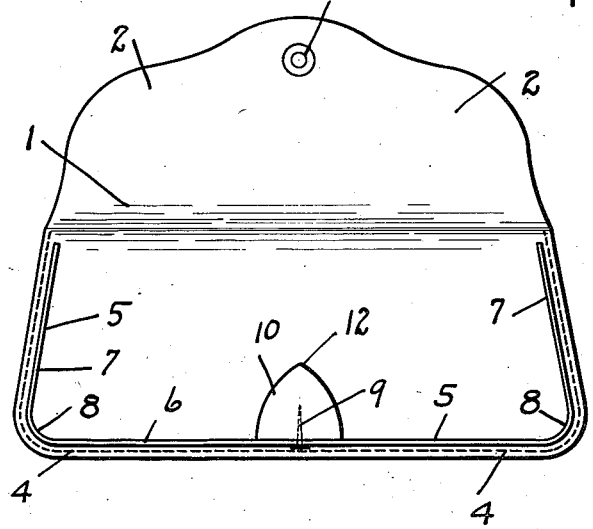
Fig. 2, is a view with the flap turned back and one of the sides of the body portion removed.
Figure 3:
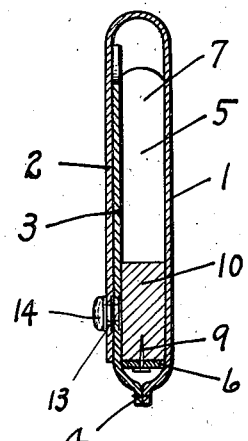
Fig. 3, is a section taken on the line 3—3 of Fig. 1, and Fig. 4, is an isometric view of the spacing element which is placed within the same for making the proper frame for the case.
Figure 4:
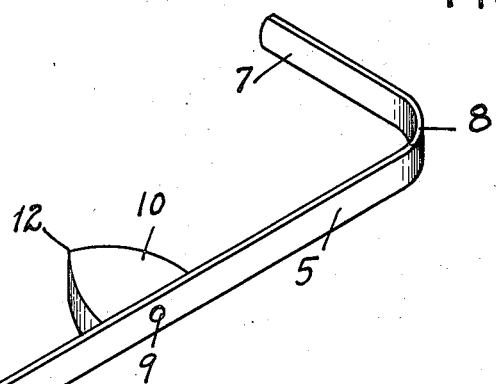

The pouch of body of the case 1 is made of two pieces of leather which are formed at the back of the case and has an integral flap 2 formed therewith, and a front piece of leather 3, sewed together at 4, to make the pocket of the case. In this pocket of the case we place a spacer element 5, formed of a bottom part 6 and two sides 7, 7, bent up at the rounded corners 8. The metal from which this is made can be made of any kind, and is preferably made flat, as shown.

At the bottom 6 of this base or element we attach by a tack 9 a supporting brace 10 which may be made of any form or shape, in the present instance being of a dome-shape running to a point at the top 12.

In manufacturing, when the body part which is the pouch of the spectacle case is made, this spacing element or spacer is inserted in same at bottom of case, the spacer impinging against the bottom of the pouch and the arm 7, 7, impinging against sides of the pouch, and the whole held in such position by the supporting block 10 which is glued into position at the sides of the pouch. On the front side of the spectacle case we place a lug or pin 13 over which the eyelet 14 on the flap fits to lock the case. This lock or pin is placed opposite to the supporting block 10.

We usually make the spacer 5 out of metal which has a certain amount of spring, so that it can be placed in the pouch or spectacle case with some effort and when in place presses outwardly against the leather pouch, so as to make the leather taut in this pouch. In this pouch the spectacles can be placed and the flap pulled over and down and locked into position and it can be as readily opened. We can apply this invention to spectacle cases of any shape, form or contour and we do not limit ourselves to the exact construction herein shown as the same may be modified or changed to some extent without departing from the spirit of the invention and while we show a preferred construction herein, we wish to be understood as claiming any modifications or changes which would fall within the scope of this specification and claims.

What we claim as new and our invention and desire to secure by Letters Patent is:

1. A spectacle case including a flexible pouch having its ends diverging toward the bottom of the pouch, and a skeleton frame removably arranged in the pouch and consisting of a bar having plain resilient arms at its ends, said bar occupying the bottom of the pouch, and said arms engaging the diverging ends of the pouch, the arms being maintained under tension by the ends of the pouch, and a member projecting up from, and fixed to the central portion of the bar, and adapted to extend into the nose-piece of spectacles when the latter occupies the pouch.

2. A spectacle case comprising a pouch of flexible material provided with a closing flap, a substantially U-shaped resilient frame arranged in the pouch and consisting of a bar occupying the bottom of the pouch and having resilient arms at its end bearing against the ends of the pouch, the ends of the pouch being shaped to hold said arms in upwardly converging relation, whereby said frame is frictionally held in the pouch.

In testimony, we affix our signatures at the city of Cincinnati, county of Hamilton and State of Ohio, this 19th day of March, 1927.

CHARLES C. YORDE.
JOHN G. HAUCKE.